US006162542A

United States Patent [19]

Castellani et al.

[11] Patent Number: 6,162,542

[45] Date of Patent: Dec. 19, 2000

[54] PROCESS TO MAKE MINIATURIZED MULTIPOLAR FLAME-PROPAGATION-RESISTANT CABLES HAVING A REDUCED EMISSION OF TOXIC AND NOXIOUS GASES AND CABLES OBTAINED THEREBY

[75] Inventors: Luca Castellani, Corsico; Luca De Rai; Pasquale Volpe, both of Milan, all of Italy

[73] Assignee: Pirelli Cavi S.p.A., Italy

[21] Appl. No.: 09/338,260

[22] Filed: Jun. 22, 1999

Related U.S. Application Data

[62] Division of application No. 08/721,695, Sep. 26, 1996, Pat. No. 5,972,138.

[30] Foreign Application Priority Data

Oct. 11, 1995 [IT] Italy ................................ MI95A2065

[51] Int. Cl.[7] ............................ B32B 15/00; H01B 11/02

[52] U.S. Cl. .......................... 428/379; 428/375; 428/383; 174/113 R

[58] Field of Search .................................... 428/372, 375, 428/378, 379, 383; 174/120 SR, 113 R

[56] References Cited

U.S. PATENT DOCUMENTS

| | | | |
|---|---|---|---|
| 5,357,020 | 10/1994 | Cogen et al. | 528/27 |
| 5,433,872 | 7/1995 | Brauer et al. | 252/28 |
| 5,505,773 | 4/1996 | Vitands et al. | 106/272 |
| 5,972,138 | 10/1999 | Castellani et al. | 156/48 |

FOREIGN PATENT DOCUMENTS

| | | | |
|---|---|---|---|
| 0082407 | 12/1982 | European Pat. Off. | C08L 23/08 |
| 3843932A1 | 6/1990 | Germany | H01B 13/16 |
| 2059140 | 8/1980 | United Kingdom | H01B 7/28 |
| 2147881 | 10/1985 | United Kingdom | H01B 7/28 |
| 223133 | 11/1990 | United Kingdom | C08L 23/04 |

OTHER PUBLICATIONS

Patent Abstracts of Japan, vol. 18, No. 17, (E–1488) Jan. 12, 1994.

Patent Abstracts of Japan, vol. 15, No. 470 (E–1139), Nov. 28, 1991.

Patent Abstracts of Japan, vol. 7, No. 155, (C–175), Jul. 7, 1958.

*Primary Examiner*—William Krynski
*Assistant Examiner*—J. M. Gray
*Attorney, Agent, or Firm*—L.P. Brooks, Norris, Mc Laughlin & Marcus

[57] ABSTRACT

The process of the invention to make miniaturized multipolar cables includes the steps of combining together a plurality of individually insulated conductors, inserting a filling in a pasty state and containing mineral fillers into the gaps existing between the conductors, partly hardening the filling and disposing the other cable components, in particular the sheath, around the conductors-filling assembly, and letting the filling become completely hard within the produced cable.

1 Claim, 1 Drawing Sheet

Figure 1:
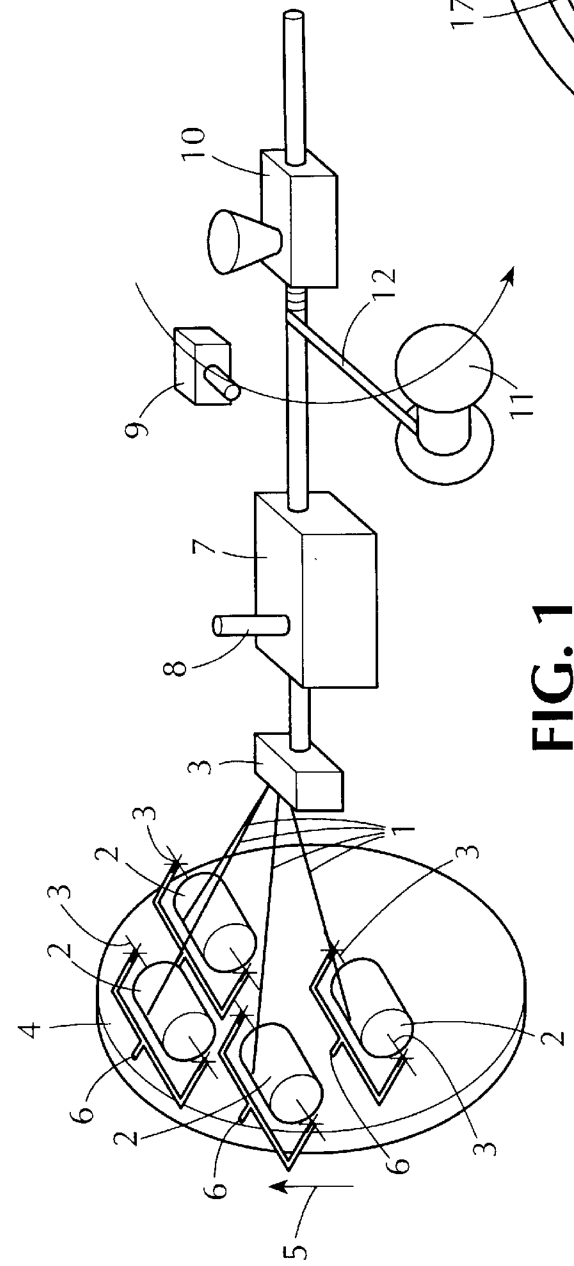

PROCESS TO MAKE MINIATURIZED MULTIPOLAR FLAME-PROPAGATION-RESISTANT CABLES HAVING A REDUCED EMISSION OF TOXIC AND NOXIOUS GASES AND CABLES OBTAINED THEREBY

This application is a division of Ser. No. 08/721,695 filing date Sep. 26, 1996, U.S. Pat. No. 5,972,138.

The present invention relates to a process to make miniaturized multipolar flame-propagation-resistant cables having a reduced emission of toxic and noxious gases.

By the word "miniaturized", cables are intended in which the insulating layer thickness in the individual electrical conductors is included between 0.20 and 0.30 mm and the sheath thickness is included between 0.3 and 0.8 mm. Examples of miniaturized cables are the object of AMT 551070 specifications.

By the expression "flame-propagation-resistant" it is intended to mean that the cables, assembled together to form bundles, must comply with the requirements established by CEI (Comitato Elettrotecnico Italiano, Italian Electrotechnical Committee) rules 20-22-III.

By the expression "reduced emission of toxic and noxious gases", it is intended to mean that the individual components of the cable, when submitted to the tests established by CEI rule 20-37-II, give rise to an overall toxicity-index value of the cable, as hereinafter defined, lower than 3.5.

Said overall toxicity index of the cable is the sum of the toxicity indices of the individual components, each of them being multiplied by the ratio of the weight that each said component has in the cable unit of length to the overall weight that all the components have in the cable unit of length.

The present invention also refers to the cables obtained by the process in question.

It is known that multipolar cables are cables provided, within one and the same sheath, with at least two and generally a plurality of electrical conductors which are individually insulated and assembled, being laid together for example.

The known process is comprised of the steps of:

- combining together at least two and generally a plurality of electrical conductors which have been already individually insulated, i.e. already provided with an insulating layer of their own, said assembling being carried out for example by laying the conductors themselves together;
- inserting fillings into the gaps left between the conductors while they are being assembled, which fillings in the case of cables belonging to the flame-retardant cable class, are made of a practically fireproof material which therefore does not propagate flame, such as cables extruded from blends of polymeric materials highly charged with mineral fillers which, as such, do not propagate flame; and
- forming a sheath of a polymeric material about the assembly obtained by the preceding steps.

While in known non-miniaturized multipolar low-voltage cables the conductor insulators have an average thickness of 0.82 mm, in miniaturized multipolar cables the insulator thickness is included between 0.20 and 0.30 mm on an average.

In the case of non-miniaturized cables no problem exists when polymeric material highly charged with mineral fillers is to be introduced by extrusion into the existing gaps between the assembled conductors. This is due to the fact that in non-miniaturized cables the thickness of the filling to be fitted into the gaps existing between the individual insulated conductors and around the assembly of same is of such a value that extrusion of the filling at relatively low temperatures is allowed without giving rise to discontinuities in the filling and/or important variations in the final diameter of the cable. On the contrary, the higher temperatures necessary for low-thickness (as in the case of miniaturized cables) extrusion of blends of polymeric materials highly charged with mineral fillers involves the presence of porosity in the filling itself caused by the emission of water vapour by desorption or decomposition of such hygroscopic mineral fillers.

It should be noted in fact that in order to be able to extrude, for example, a polyolefin-based blend containing mineral fillers such as magnesium hydroxide or aluminium hydroxide in an amount of 40% by weight with respect to 100 parts by weight of polymer, the temperature to be reached during the extrusion for making the blend fluid enough so that gaps between the conductors can be properly filled, shall be about 150° C.

The Applicant has observed that the possibility of applying fillings formed of polymeric materials containing high amounts of mineral fillers by extrusion, is limited to a minimum thickness of 0.5 mm.

Therefore, the application of a filling by extrusion is to be excluded for miniaturized multipolar cables because in said cables the filling thickness between the conductors is on the order of 0.20–0.25 mm.

However, in order to be able to make miniaturized multipolar flame-propagation resistant cables it is necessary to carry out filling of the gaps between the assembled conductors by a material resisting flame propagation or flame-retardant material.

In a known solution it is provided that a glass rod or a glass-fibre cord is disposed into the gaps existing between the conductors combined together to form a cable.

This known solution, however, has some drawbacks. If glass rods combined with the cable conductors are used as the filling, the cable flexibility is clearly reduced. In addition, the glass rod's brittleness makes the arrangement of said rods close to the conductors troublesome.

If a glass-fibre cord is used as the filling, which cord may be optionally covered with a sheath of polymeric material, there is a risk that, due to breaking of some glass fibres in the cord, which fibres are very brittle being made of glass, said same glass fibres may project from the cord in the form of needles and consequently cause annoying injuries to the operators when they are assembling the cables with fittings such as connecting means or with appliances to be supplied power by the cable.

In both cases, in addition, since it is necessary to carry out coupling of the glass rods or glass-fibre cords, the assembling operations are made more complicated because the number of components to combine together is twice that of the insulated conductors.

Resorting to the use of section members of polymeric materials containing high amounts of mineral fillers in place of the glass rods or glass-fibre cords also involves the necessity, in addition to the complexity of the above mentioned assembling operation, to utilize section members having a very low tensile strength as compared with the tensile strength possessed by the insulated conductors, which will bring about the danger of breaking said section members while a cable is being manufactured.

A solution similar to the one disclosed in U.S. Pat. No. 4,978,649, comprises introducing, at room temperature, blends of polymers having a high flowability at room temperature and capable of cross-linking in time still at room temperature, into multipolar cables already provided with a sheath for creating fillings between the assembled conductors, does not seem to be practicable. In fact the addition of the amounts of mineral fillers necessary to make the miniaturized cable flame retardant to the blends designed to form the fillings gives rise to such viscosity values in said blends that they cannot be pumped at room temperature into the gaps existing between the conductors and sheath in a cable.

In one aspect, the present invention relates to a process for making flexible miniaturized multipolar flame-propagation-resistant cables having a reduced emission of toxic and noxious gases, comprising the steps of:

combining together at least two electrical conductors, individually covered with an insulating layer, gaps being defined between said conductors combined together, inserting a filling into at least one fraction of said gaps, applying a sheath surrounding the assembly formed of the conductors combined together and the filling inserted in the gaps defined between said conductors, characterized in that the step of filling the gaps defined between the conductors comprises the steps of:

inserting a polymeric material containing dispersed mineral fillers into the gaps defined between the conductors immediately after they are combined together, at such an application temperature that the material is in a pasty state, with a viscosity lower than a predetermined value, increasing the viscosity of the polymeric material inserted into the gaps existing between the conductors until a value corresponding to a substantial stability of shape before application of the sheath, hardening (completing hardening of) the polymeric material after application of the sheath.

Preferably, the mineral fillers are in an amount included between 40% and 70% by weight of the overall weight of the blend, and they are selected from magnesium hydroxide and aluminium hydroxide.

In particular, the viscosity of the polymeric material at said application temperature is such that it causes the substantial filling of all gaps defined between said conductors and, preferably, said viscosity measured at 25° C. by a Brookfield viscometer A:4 V:2.5 is lower than, or equal to about 1100000 mPa.sec and more preferably, lower than or equal to about 500000 mPa.sec. Preferably, the application temperature of the polymeric material is room temperature.

In a preferred embodiment, the step of inserting the polymeric material in a pasty state into the gaps defined between the conductors is carried out by making the conductors, individually covered with an insulating layer and already assembled together, pass through a chamber containing said polymeric material at the pasty state maintained at said application temperature.

In a preferred embodiment, the polymeric material to be introduced into the gaps defined between the conductors consists of a blend of a first polymer and a second polymer which is subjected to cold cross-linking by polyaddition. In particular the first polymer is polydimethyl siloxane having terminal vinyl groups, whereas the second polymer is a silicone-based polymer containing Si—H groups.

Preferably, the increase in the viscosity of the polymeric material is achieved by heating to a predetermined temperature and, more preferably, said predetermined temperature is included between 170° C. and 180° C.

In a second aspect, the present invention relates to a miniaturized flexible multipolar flame-propagation-resistant cable having a reduced emission of toxic and noxious gases, which comprises:

at least two individually insulated electric conductors combined together, a filling inserted into the gaps existing between said insulated conductors combined together, a sheath surrounding the assembly formed of the insulated conductors combined together and the filling, characterized in that the filling inserted into the gaps between the insulated conductors comprises a blend of a first polymer selected from polydimethyl siloxanes having terminal vinyl groups, a second polymer selected from silicones containing Si—H groups and mineral fillers selected from magnesium hydroxide and aluminium hydroxide, in an amount included between 40% and 70% by weight of the overall weight of the blend.

Figure 2:
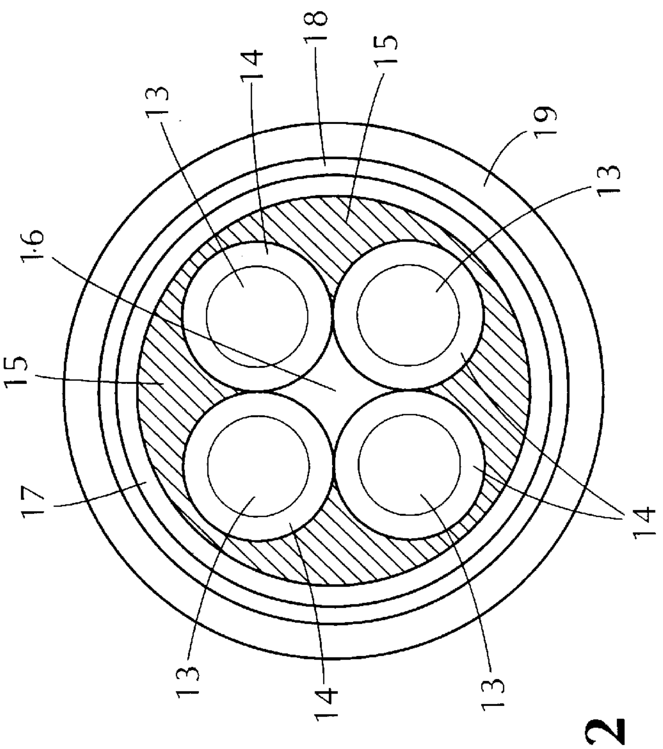

The present invention will be best understood from the following detailed description given hereinafter by way of non-limiting example with reference to the accompanying drawings, in which:

FIG. 1 diagrammatically shows a line along which the process of the invention is carried into effect; and FIG. 2 is a sectional view of a miniaturized multipolar cable according to the invention.

The process of the invention will be now described with the aid of FIG. 1.

The first step in the process comprises in combining together at least two and in general a plurality of individually-insulated conductors, that is each provided with an electrically-insulating layer. Each conductor is stored on a reel.

In the particular case of FIG. 1 four insulated conductors 1 are provided and they are stored on reels 2 freely rotating about their axis 3.

Reels 2 are mounted on a rotating framework 4, the rotation of which takes place for example in the direction of arrow 5. In addition, each reel 2 is mounted on a spindle 6 imposing rotation of each reel in a direction opposite to that of the framework 4 so that the insulated conductors are not subjected to twist stresses while the cable is being manufactured.

Downstream of the reel 2 group there is a stationary assembling mould 3 which carries out the operation of assembling or combining together the four insulated conductors putting them into mutual contact.

In the particular embodiment shown in FIG. 1 the four insulated conductors 1 are laid together having taken a helical configuration, due to the combined action exerted by the rotating framework and the stationary assembling mould.

The assembled conductors obtained from the first processing step are submitted to the second step which comprises inserting a pasty material, preferably of a polymeric nature, at an application temperature as below defined, into at least some of the gaps existing between the assembled conductors, which pasty material after undergoing a viscosity increase capable of giving rise to a partial hardening, will form a filling.

By the term "application temperature" it is intended a temperature at which the material to be applied has a sufficient flowability so that it can fill the gaps provided for filling in a substantially complete manner without causing gas emissions, in particular water vapour emissions from the mineral fillers incorporated into the material to be applied.

Preferably the "application temperature" is the room temperature. The nature of said pasty material and features of same will be set forth in more detail in the following.

A particular embodiment of the second processing step, as shown comprises FIG. 1, in making the assembly of the conductors combined together pass through a chamber 7 filled with said pasty fluid which is at the application temperature, i.e. preferably room temperature.

The pasty fluid is admitted to chamber 7, by pumping for example, through a duct 8. Within chamber 7 the pasty fluid incorporates the assembly of the conductors laid together filling the gaps existing therebetween.

On coming out of chamber 7 the pasty fluid in excess is removed from the conductors by a gauged orifice by means of which a coating layer of predetermined thickness is formed around the assembly of the conductors laid together.

Downstream of chamber 7 the third step of the process takes place and it consists in performing a partial hardening of the pasty material applied to the assembly of insulated conductors laid together so as to give them a substantial stability of shape.

By the expression "substantial stability of shape" it is intended that the viscosity of the material applied in a pasty state increases to such an extent that, the material does not drip any longer under its own weight during the period elapsing from when it is applied to when the formation of the sheath about the cable occurs.

Taking into account the specific materials to be used for forming the fillings and the selected technique for carrying out said partial hardening of the pasty material, a person of ordinary skill in the art, based on the available knowledge of the materials and the above indications, will be able to establish the appropriate viscosity increase without further instructions.

A particular embodiment of the third step in question consists in heating the outer surface of the pasty material layer by a hot air blow, emitted by a fan 9 for example, so that an increase in the viscosity of said layer due to partial cross-linking and therefore a hardening of same is caused to such an extent that said material is prevented from undergoing substantial deformations and variations in the shape it has received from the gauged orifice located at the chamber 7 exit, as hereinafter defined.

The temperature value of the air blown onto the outer surface of the applied pasty material as well as the quantity of this hot air depends on the nature of the pasty material employed and therefore a person skilled in the art, based on his knowledge of the composition, will be able to establish this value without any particular instructions. Then the assembly of the insulated conductors laid together and to which the pasty material has been applied are submitted to the fourth step of the process which comprises applying a sheath made of a plastic material for example, and obtained by means of extrusion for example by an extruder 10, as shown in FIG. 1.

A reel not shown, on which the cable is stored, is located downstream of chamber 7.

The fourth step can be preceded by a lapping step during which a cover tape, of plastic material for example, is applied to the assembly of insulated conductors laid together and having the partly-hardened pasty material applied thereto.

This operation may be carried out for example, as shown in FIG. 1, by a lapping machine provided with a spool 11 on which a tape 12 is stored, which spool is rotated around the assembly of the conductors laid togegher.

Another optional step to be executed between the lapping step and that involving formation of the sheath comprises applying a screen of braided copper wires. For this operation (not shown in FIG. 1) means known per se and therefore not further described is employed.

According to an alternative embodiment of the invention (not shown), for carrying into effect the process of the invention, the framework 4 is stationary and also stationary are spindles 6, whereas the assembly of the conductors combined together rotates about the longitudinal axis of same following rotation about this axis of the reel, not shown in FIG. 1, on which the produced cable is stored.

A particular cable obtained by the above described process and falling within the scope of the present invention as well, is shown in FIG. 2, in a sectional view at right angles to the axis of same. Starting from the centre and going towards the external portion, the cable has four electrical conductors 13 in the form of cords formed of copper wires each provided with an insulator means consisting of a layer of an extruded polymeric material as stated in AMT 551070 specification relating to miniaturized cables.

Provided around the assembly of the four insulated conductors is a filling of polymeric material applied according to the process of the present invention as previously described and the composition of which will be detailed later on.

To the ends of the present invention, by gaps defined between the insulated conductors, to be filled with polymeric material in a pasty state, it is intended the star-shaped spaces defined between the outwardly-facing conductor surfaces and an external cylindrical surface enclosing all the insulated conductors, tangent to or external of said conductors.

As shown in FIG. 2, this polymeric material fills the gaps 15 existing between the insulated conductors, preferably but not necessarily without occupying the radially innermost space 16, and forms a cylindrical envelope about the assembly of same.

Disposed over the external cylindrical surface of the filling material is a lapping tape 17 applied by overlapping each winding with the edge of the preceding winding.

A screen 18 is present over the lapping tape and it consists of one or more layers formed of braided copper wires.

A sheath of polymeric material 19 applied by extrusion is disposed over the assembly formed of the previously described elements.

As previously said, the filling in the gaps 15 between the conductors is formed of a polymeric material applied thereto in a pasty state, at an application temperature that in this particular case is room temperature, which material quickly becomes partly hard by incipient cross-linking by means of heating immediately after it has been applied, so as to increase viscosity to such a value that deformation of same is prevented, the material acquiring a stability of shape that will enable application of the external cable components to be carried out.

In the particular case in question "stability of shape" means that between the exit from the gauged orifice of chamber 7 at which the filling material forms a perfectly cylindrical envelope and the position at which the sheath is applied, the dimensional variation that can take place in the external surface of the cylindrical envelope must not exceed 20% and preferably must not exceed 10% of the gauged orifice diameter.

Described hereinafter is an appropriate material for a preferred embodiment of the invention. The material in question is a two-polymer-based blend in which the two polymers are susceptible of cold cross-linking by polyaddition and contain mineral fillers in an amount included between 40% and 70% by weight of the overall weight of the polymer blend.

One of these two polymers is a polydimethyl siloxane containing terminal vinyl groups, the second polymer being a silicone-based polymer containing Si—H groups and the mineral fillers are selected from magnesium hydroxide and aluminium hydroxide.

More specifically, the first polymer, that is polydimethyl siloxane containing terminal vinyl groups, used for the experimental tests has a viscosity at 25° C. of 6400 mPa.sec measured by a Brookfield viscometer utilizing a spindle RV7 rotated at a speed of 2.5 rpm, whereas the second polymer, that is the silicone-based polymer containing Si—H groups, has a viscosity of 4800 mPa.sec measured with a Brookfield viscometer using a spindle RV7 rotated at a speed of 2.5 rpm.

The utilized mineral filler is magnesium hydroxide.

Experimental examples providing the use of a mineral filler comprising aluminium hydroxide are not expressly reproduced in that they are exactly the same as those obtained by the use of magnesium hydroxide as the filling.

The mineral filler, that is magnesium hydroxide, was admixed with the first polymer by a mixer and in the mixture also a chloroplatinic-acid and divinyl-tetramethyl-siloxane compound acting as a catalyst for the polyaddition reaction of the two polymers was added.

For the group consisting of the first polymer, the mineral filler and the catalyst, hereinafter referred to as component A, formulations having the following compositions were prepared:

| | first polymer parts by weight | $Mg(OH)_2$ parts by weight | above cited catalyst ppm |
|---|---|---|---|
| A1 | 100 | 50 | 20 |
| A2 | 100 | 85 | 20 |
| A3 | 100 | 160 | 20 |
| A4 | 100 | 320 | 20 |
| A5 | 100 | 400 | 20 |

The second polymer, that is the silicone-based polymer containing Si—H groups, forms component B by itself. With components A1, A2, A3, A4, A5 and component B five blends were prepared by addition of one part by weight of component B to 10 parts by weight of each of said components A.

Mixing was carried out with an electric mixer under stirring at 23° C. over a period of ten minutes, the mixer rotating at such a speed that the introduction of air bubbles in the mixture was avoided.

The obtained blends had the following viscosities, measured with a Brookfield viscometer using a spindle RV7, the rotation speed of said spindle being 2.5 rpm:

| Type of blend | Viscosity after 15 m from preparation (m Pa · sec) | $Mg(OH)_2$ |
|---|---|---|
| A1 + B | 83000 | 30% by weight |
| A2 + B | 185000 | 41% by weight |
| A3 + B | 307200 | 55% by weight |
| A4 + B | 970000 | 70% by weight |
| A5 + B | 1220000 | 73% by weight |

It was first of all observed that with blend A5, that is a blend containing 73% by weight of magnesium hydroxide, it is impossible to make a cable having acceptable features in that at room temperature the viscosity of this blend is very high and does not offer the assurance of a complete filling of the gaps between the conductors.

It was also observed that, for all blends of components A1, A2, A3, A4 with component B kept at 23° C., the time after which the obtained product had reached such a viscosity that application of same was inhibited (approximately >1500000 mPa.sec), is about 90 minutes.

To the ends of the present invention an appropriate viscosity of the overall polymeric blend at the application temperature is believed to be preferably lower than or equal to 1100000 mPa.sec and, more preferably, lower than or equal to 500000 mPa.sec.

It was also observed that for each blend the required time at 23° C. for reaching a complete hardening is about 8 hours.

Using the blends containing 30, 41, 55 and 70% by weight of magnesium hydroxide respectively, four cables were made having the structure shown in FIG. 2 which has been previously described.

The four cables have the same sizes and differ from each other exclusively for the different type of blend used to make the cable filling.

The dimensional features of the cables, their components and the material of the latter are now reproduced and their features correspond to a particular case contained in AMT 551070 specifications.

The cable conductors have a section of 0.6 $mm^2$ and are formed of 19 copper wires with a diameter of 0.2 mm.

The insulating layer of the conductors has a thickness of 0.25 mm. For this insulating layer a polybutylene terephthalate-based blend was selected which was applied by extrusion to the conductor. The blend contained a silicone etherimide copolymer, a brominated additive having a content of 3.5% by weight of bromine, antimony(III) oxide and stabilizers of a type known per se.

The tape used to form layer 17 of FIG. 2 is a tape of polyethylene terephthalate of a thickness of 20 $\mu$m.

This layer is formed by wrapping a single tape and this wrapping is carried out with an overlap of 50%.

The different filling blends differentiating the cables from one another were applied under the same conditions and following the same modalities.

In particular, the blends were applied to the four insulated conductors, already laid together, by mixing, at 23° C., the components (A1, A2, A3, A4 with component B) stored into separate tanks, immediately before their application, sending said components by metering pumps having volumetric counters to a mixer and directly loading the blend to the application apparatus.

When coming out of the apparatus carrying out application of the filling, said conductors have a continuous layer of a thickness of 0.25 mm formed around them at the radially outermost area thereof.

Immediately downstream of the filling-applying apparatus heating of said filling is carried out by hot air.

In the particular embodiment of the cables under examination the hot air jet employed has a flow rate of 400–500 l/minute and the temperature of said air was selected such that the whole external surface of the applied filling could have a temperature included between 170° C. and 180° C. for a period of some seconds.

At a position radially external of the lapping tape there is a copper-wire screen and more particularly a screen comprising braided copper wires of a diameter of 0.2 mm.

Located over the copper-wire screen is the cable sheath. This sheath has a thickness of 0.6 mm and is formed of a base blend which is subsequently set by means of vinylsilanes.

The base blend consists of:

100 parts by weight of an ethylene vinylacetate copolymer, 130 parts by weight of magnesiun hydroxide, 5 parts by weight of stabilizers of a type known per se and appropriate for blends of polymeric materials.

This base blend was set by means of vinylsilanes known per se in an appropriate double-screw, extruded about the cable by addition of tin dibutyl laurate as the catalyst and cross-linked by dipping the cable into water at 80° C. over a period of 16 hours after sealing the cable ends.

In addition to the four cables differing from each other for the filling material composition alone, a fifth cable was made which differs from the others exclusively in that the filling material is absent.

The cables in question (those containing the filling and the filling-free cable) were submitted to the flame-propagation test prescribed by rule CEI 20-20/III.

For each test, bundles of cable lengths 3.5 m long were used in a number sufficient to form a volume of 1.5 $dm^3$ of non metallic material. As a result, bundles of 71 cable lengths were used for cables provided with filling and a bundle of 123 cable lengths for unfilled cable.

Each cable bundle was disposed upright in a furnace as prescribed by the rule in question and flame was applied to the bundle base for a period of 20 minutes. The flame was obtained by combustion of air and propane, the propane flow rate being of 996 l/hour and the air flow rate of 4600 l/hour.

During the tests the temperature outside the furnace was 24° C., the sky was clear and the wind was running at a speed of 3 m/sec, all of the above values falling within those allowed by the rule in question.

Cables passing the flame-propagation-resistance test are then submitted to determination of the toxicity index for the gases generated during combustion.

This determination of the toxicity index for the gases generated during combustion was carried out following the modalities briefly described hereinafter and as provided by CEI 20-37 II rule.

The results obtained with the flame-propagation-resistance test are reproduced in the following table.

| Type of cable | $Mg(OH)_2$ in filling | Elapsed time from flame application (minutes) | Max.height of length submit. to combustion (m) |
|---|---|---|---|
| Cable I | absent | 9 | 2.5 |
| Cable II | 30% | 10 | 2.5 |
| Cable III | 41% | 20 | 1.4 |
| Cable IV | 55% | 20 | 1.2 |
| Cable V | 70% | 20 | 1.3 |

As viewed from the table, only cables III, IV and V passed the flame-propagation-resistance test and only said cables were subsequently submitted to the tests for determining the toxicity index for the generated gases, following the combustion modalities prescribed by CEI 20-37 II rule.

For the purpose, from the components of each cable the non-metallic materials were removed, i.e.: conductor insulator, filling, tape wrapped around the filling, cable sheath. These materials were chopped to form powders. For the powders of each cable component, the toxicity factors, that is the ratios between the real amount of the particular gases generated (specified in the following) and the reference concentration for each of said gases, i.e. the amount of gas that would be mortal for men after an exposure of 30 minutes were determined.

Then the percent weights of each cable component were determined per unit of length of the cable itself.

The overall toxicity indices for each cable were obtained by summing the products of the toxicity indices of the individual components by the percent ratios by weight of said components to the total weight of the components per unit of length of the cable.

Practically the following formula was used in which the abbreviation ITC means "toxicity index":

$$ITC_{cable}=(\%\text{ sheath weight}\times ITC_{sheath})+(\%\text{ tape weight}\times ITC_{tape})+(\%\text{ filling weight}\times ITC_{filling})+(\%\text{ insulator weight}\times ITC_{insulator}).$$

The toxicity indices obtained for the cables submitted to the test are reproduced in the following table, where one can see that all the cables have a toxicity index lower than 3.5.

| | | CABLE III | CABLE IV | CABLE V |
|---|---|---|---|---|
| sheath | ITC | 2.3 | 2.3 | 2.3 |
| | wt % | 48.8 | 47.8 | 46.84 |
| tape | ITC | 3.5 | 3.5 | 3.5 |
| | wt % | 0.54 | 0.53 | 0.51 |
| filling | ITC | 2.1 | 1.7 | 1.5 |
| | wt % | 31.4 | 32.86 | 34.24 |
| insulator | ITC | 7.2 | 7.3 | 7.3 |
| | wt % | 19.2 | 18.8 | 18.4 |
| cable ITC in all | | 3.2 | 3.04 | 2.95 |

The different components were also submitted to determination of the amount of corrosive hydrogen halides emitted during the combustion according to CEI 20-37-I specification and it was found that the hydrogen chloride values expressed in % for the insulator were lower than 1%, whereas for all other cable components the value for said acid was substantially zero and at all events of an undetectable amount.

The above experimental tests clearly show that with the process of the invention the intended aim is achieved, that is miniaturized flame-propagation-resistant cables are manufactured which are provided with a filling charged with mineral fillers and having a low emission of toxic and noxious gases.

What is claimed is:

1. A miniaturized flexible multipolar flame-propagation-resistant cable having a reduced emission of toxic and noxious gases, which comprises:

at least two individually insulated electric conductors combined together, a filling inserted into the gaps existing between said insulated conductors combined together, a sheath surrounding the assembly formed of the insulated conductors combined together and the filling, characterized in that the filling inserted into the gaps between the insulated conductors comprises a blend of a first polymer selected from polydimethyl siloxanes having terminal vinyl groups, a second polymer selected from silicones containing Si—H groups and mineral fillers selected from magnesium hydroxide and aluminium hydroxide, in an amount included between 40% and 70% by weight of the overall weight of the blend.

* * * * *